US007738994B2

(12) United States Patent
Rainey et al.

(10) Patent No.: US 7,738,994 B2
(45) Date of Patent: Jun. 15, 2010

(54) SYSTEMS AND METHODS FOR PROCESSING ITEMS IN AN ITEM DELIVERY SYSTEM

(75) Inventors: Brent A. Rainey, Sterling, VA (US); Daryl S. Hamilton, Hyattsville, MD (US); Anthony M. Ferlaino, Fairfax, VA (US)

(73) Assignee: United States Postal Service, Washington, DC (US)

( * ) Notice: Subject to any disclaimer, the term of this patent is extended or adjusted under 35 U.S.C. 154(b) by 166 days.

(21) Appl. No.: 10/468,301

(22) PCT Filed: Feb. 21, 2002

(86) PCT No.: PCT/US02/03394

§ 371 (c)(1),
(2), (4) Date: Aug. 20, 2003

(87) PCT Pub. No.: WO02/069180

PCT Pub. Date: Sep. 6, 2002

(65) Prior Publication Data

US 2004/0083228 A1 Apr. 29, 2004

Related U.S. Application Data

(60) Provisional application No. 60/269,971, filed on Feb. 21, 2001.

(51) Int. Cl.
*G06F 7/00* (2006.01)
(52) U.S. Cl. ............... 700/227; 700/228; 235/375; 156/387; 209/900
(58) Field of Classification Search ............... 707/1, 707/2; 700/227, 228; 198/349.6; 209/584, 209/900; 235/375, 385; 156/387
See application file for complete search history.

(56) References Cited

U.S. PATENT DOCUMENTS

| 5,043,908 | A | * | 8/1991 | Manduley et al. ........... 700/227 |
| 5,138,140 | A | | 8/1992 | Siemiatkowski et al. .... 235/462 |
| 5,177,368 | A | | 1/1993 | Kay ........................... 250/566 |
| 5,208,762 | A | | 5/1993 | Charhut et al. .............. 364/478 |
| 5,216,620 | A | | 6/1993 | Sansone ..................... 364/478 |

(Continued)

FOREIGN PATENT DOCUMENTS

JP 5-40841 2/1993

OTHER PUBLICATIONS

Brent A. Rainey et al., "Systems and methods for producing and managing a tracking label in an item delivery system," U.S. Appl. No. 10/468,296, filed Aug. 20, 2003.

(Continued)

*Primary Examiner*—Cheyne D Ly
(74) *Attorney, Agent, or Firm*—Finnegan, Henderson, Farabow, Garrett & Dunner, L.L.P.

(57) ABSTRACT

Tracking an item through an item delivery system comprises reading a tracking indicia on the item, entering data from the tracking indicia into a management system, providing access to the management system, and updating the management system with information regarding the item passing various points within the item delivery system. In addition, the management system may comprise at least one of a business interface system, a coding strategy system, a surface/air management system, a processing operations information system, an activity-based costing system, and a delivery operations information system.

42 Claims, 7 Drawing Sheets

U.S. PATENT DOCUMENTS

| | | | |
|---|---|---|---|
| 5,292,008 A | 3/1994 | Sansone et al. | 209/584 |
| 5,325,303 A | 6/1994 | Walz et al. | 364/464.02 |
| 5,388,049 A | 2/1995 | Sansone et al. | 364/464.02 |
| 5,421,778 A | 6/1995 | Kouramanis | 462/2 |
| 5,470,427 A | 11/1995 | Mikel et al. | 156/387 |
| 5,586,036 A | 12/1996 | Pintsov | |
| 5,602,382 A | 2/1997 | Ulvr et al. | |
| 5,612,889 A | 3/1997 | Pintsov et al. | 364/478.14 |
| 5,697,648 A | 12/1997 | Petkovsek | 283/61 |
| 5,726,431 A | 3/1998 | VanDonkelaar et al. | |
| 5,880,443 A | 3/1999 | McDonald et al. | |
| 5,915,730 A | 6/1999 | Petkovsek | |
| 5,951,053 A | 9/1999 | Petkovsek | 283/81 |
| 6,011,758 A | 1/2000 | Dockes et al. | 369/30 |
| 6,035,291 A | 3/2000 | Thiel | |
| 6,035,391 A | 3/2000 | Isaman | 712/222 |
| 6,089,613 A | 7/2000 | Petkovsek | 283/79 |
| 6,134,561 A | 10/2000 | Brandien et al. | |
| 6,154,733 A | 11/2000 | Pierce et al. | 705/408 |
| 6,186,554 B1 | 2/2001 | Raming | |
| 6,203,068 B1 | 3/2001 | Petkovsek | |
| 6,208,910 B1 * | 3/2001 | Michael et al. | 700/225 |
| 6,321,992 B1 | 11/2001 | Knowles et al. | |
| 6,338,434 B1 | 1/2002 | Wilz, Sr. et al. | |
| 6,398,112 B1 | 6/2002 | Li et al. | |
| 6,863,310 B1 | 3/2005 | Petkovsek | |
| 2001/0032881 A1 * | 10/2001 | Wells et al. | 235/385 |
| 2002/0065717 A1 | 5/2002 | Miller et al. | |
| 2004/0074965 A1 | 4/2004 | Raney et al. | |
| 2004/0074977 A1 | 4/2004 | Rainey et al. | |

OTHER PUBLICATIONS

United States Postal Service Special Services, "Technical Guide: Postal Forms and Labels (Domestic Service Only)," Publication 109, Updated Notice, Mar. 23, 2001.

International Preliminary Examination Report dated Mar. 17, 2003, for the corresponding PCT application No. PCT/US02/03394, filed Feb. 21, 2002 (5 pages).

* cited by examiner

SYSTEMS AND METHODS FOR PROCESSING ITEMS IN AN ITEM DELIVERY SYSTEM

RELATED APPLICATIONS

Under provisions of 35 U.S.C. §119(e), Applicants claim the benefit of U.S. Provisional Application No. 60/269,971, filed Feb. 21, 2001, which is incorporated herein by reference. PCT Patent Applications Serial Nos. PCT/US2002/003396, PCT/US2002/003393, PCT/US2002/003395, filed on even date herewith, each in the name of Brent A. Rainey, et al. and entitled "IMPROVED TRACKING LABEL", "SYSTEMS AND METHODS FOR PRODUCING AND MANAGING A TRACKING LABEL IN A AN ITEM DELIVERY SYSTEM", and "SYSTEMS AND METHODS FOR UTILIZING A TRACKING LABEL IN AN ITEM DELIVERY SYSTEM," respectively, and each assigned to the assignee of the present application, are hereby incorporated by reference.

DESCRIPTION OF THE INVENTION

1. Field of the Invention

The invention relates generally to systems and methods for processing items in an item delivery system, and more particularly, to systems and methods for tracking items passing through an item delivery system.

2. Background of the Invention

The United States Postal Service (USPS) is an independent government agency that provides mail delivery and other services to the public. The USPS is widely recognized as a safe and reliable means for sending and receiving mail and other items. With the advent and steady growth of electronic mail and electronic commerce, the physical mail stream will increasingly be utilized for sending and receiving packages and other items. In an effort to lower operating costs and increase value for their customer base, many high volume delivery users prepare packages and other items with automated equipment and presort and label the items prior to placement of the items into an item delivery system. These customers, along with other senders, wish to track items as they pass through various points in the item delivery system.

Therefore, the need to efficiently process items in an item delivery system has become a common need for many item delivery system operators. More specifically, tracking items passing through an item delivery system has become a critical need for many item delivery system operators. This is because in an increasingly competitive environment, meeting and exceeding the expectations of customers, senders, or others who receive services is essential for item delivery system operators.

Conventional systems and methods often do not allow for the tracking of items. Rather, conventional systems merely provide routing information. For example, conventional systems provide information that allows items to be sent from point A to point B, and do not track where the item came from, who prepared the item, when the item was prepared, or where the item is in the item delivery system.

With prior art systems and methods, for example, there can be hundreds of tracking indicia that are identical for different items going to the same place. When problems are detected in conventional systems, for example, an incorrect label or an incorrect method of preparing the item, there is no way to track exactly when, where, or how the problem was created. Therefore, no means exists to identify and correct the problem.

Thus, there remains a need for efficiently processing items in an item delivery system. In addition, there remains a need for systems and methods for tracking items passing through an item delivery system.

SUMMARY OF THE INVENTION

Consistent with the present invention, systems and methods for processing items in an item delivery system are provided that avoid problems associated with prior art systems and methods for processing items in an item delivery system as discussed herein above.

In one aspect, a method for tracking an item through an item delivery system comprises reading a tracking indicia on the item, entering data from the tracking indicia into a management system, providing access to the management system, and updating the management system with information regarding the item passing various points within the item delivery system.

In another aspect, a system for tracking an item through an item delivery system, comprises a component for reading a tracking indicia on the item, a component for entering data from the tracking indicia into a management system, a component for providing access to the management system, and a component for updating the management system with information regarding the item passing various points within the item delivery system.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DESCRIPTION OF THE EMBODIMENTS

Figure 1:
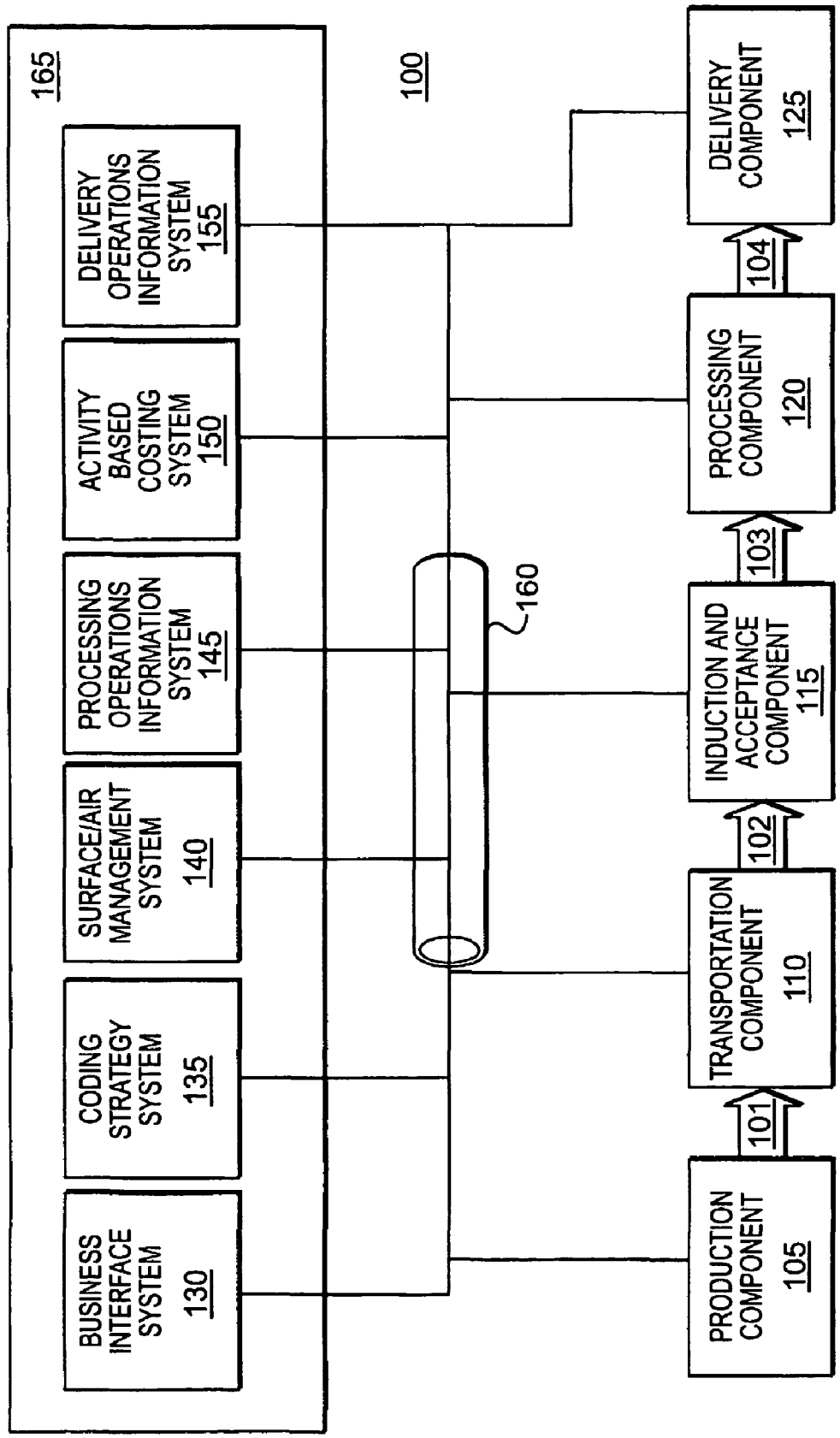
FIG. 1 is a functional block diagram of an exemplary system for tracking an item through an item delivery system consistent with an embodiment of the present invention.

Reference will now be made to various embodiments according to this invention, examples of which are shown in the accompanying drawings and will be obvious from the description of the invention. In the drawings, the same reference numbers represent the same or similar elements in the different drawings whenever possible.

Consistent with an embodiment of the present invention, a system for tracking an item through an item delivery system comprises a component for reading a tracking indicia on the item, a component for entering data from the tracking indicia into a management system, a component for providing access to the management system, and a component for updating the management system with information regarding the item passing various points within the item delivery system.

As herein embodied and illustrated in FIG. 1, a system for processing items in an item delivery system 100 may comprise a production component 105, a transportation component 110, an induction and acceptance component 115, a processing component 120, and a delivery component 125. Generally, as illustrated by flow arrows 101, 102, 103, and 104, items may be created in production component 105 and flow through transportation component 110, induction and acceptance component 115, processing component 120, and delivered by delivery component 125. Items used in conjunction with exemplary embodiments of the present invention may comprise a mailpiece, a United States Postal Service Priority Mail package, a United States Postal Service Express Mail package, or other items, as are known by those of ordinary skill in the art. Moreover, an item may comprise a plurality of items passing through portions of system 100 gathered into containers, such as, trays, sacks, or tubs as are know by those of ordinary skill in the art.

In addition to the aforementioned components, item delivery system 100 may further comprise a business interface system 130, a coding strategy system 135, a surface/air management system 140, a processing operations information system 145, an activity-based costing system 150, and a delivery operations information system 155. Connecting the aforementioned systems and components is a data communications network 160.

Referring now to FIG. 1, network 160 may comprise, for example, a local area network (LAN) or a wide area network (WAN). Such networking environments are commonplace in offices, enterprise-wide computer networks, intranets, and the Internet, and are known by those skilled in the art. When a LAN is used as network 160, the various servers, systems, components, and devices may be connected to network 160 through a network interface located at each of the respective servers, systems, components, and devices. When a WAN networking environment is utilized as network 160, the various servers, systems, components, and devices each typically include an internal or external modem (not shown) or other means for establishing communications over the WAN, such as the Internet.

Network 160 may utilizes wireline or wireless telecommunications technologies when connecting to, for example, the various servers, systems, components, and devices of system 100. Wireless telecommunications may include radio transmission via the airwaves; however, those of ordinary skill in the art will appreciate that various other telecommunication techniques can be used to provide wireless transmission including infrared line of sight, cellular, microwave, satellite, blue-tooth packet radio, and spread spectrum radio. Wireless data may include, but is not limited to, paging, text messaging, e-mail, Internet access, instant messaging, and other specialized data applications specifically excluding or including voice transmission.

Each of the elements comprising system 100, and the interrelationships between the aforementioned components and the aforementioned systems, will be described in greater detail below with respect to FIG. 2 through FIG. 6.

Generally, the aforementioned systems 130-155 may collectively represent a management system 165 that allows for the exchange of information between all systems and components comprising system 100. Information may be conveyed to management system 165 so that the applications that may be running on any of the systems or components can make best use of available information and create reports that will allow for informed decision analysis and allow for other types of planning and activities that will effect a positive change or increase operational efficiencies.

Consistent with an embodiment of the present invention, a component for reading a tracking indicia may comprise the production component 105, a component for entering data from the tracking indicia into a management system may comprise transportation component 110, a component for providing access to the management system may comprise any system capable of accessing network 160, and a component for updating the management system with information may comprise any component within system 100.

Those of ordinary skill in the art, however, will appreciate that other elements of system 100 may comprise the component for reading a tracking indicia, the component for entering data from the tracking indicia into a management, the component for providing access to the management system, and the component for updating the management system with information.

Figure 2:
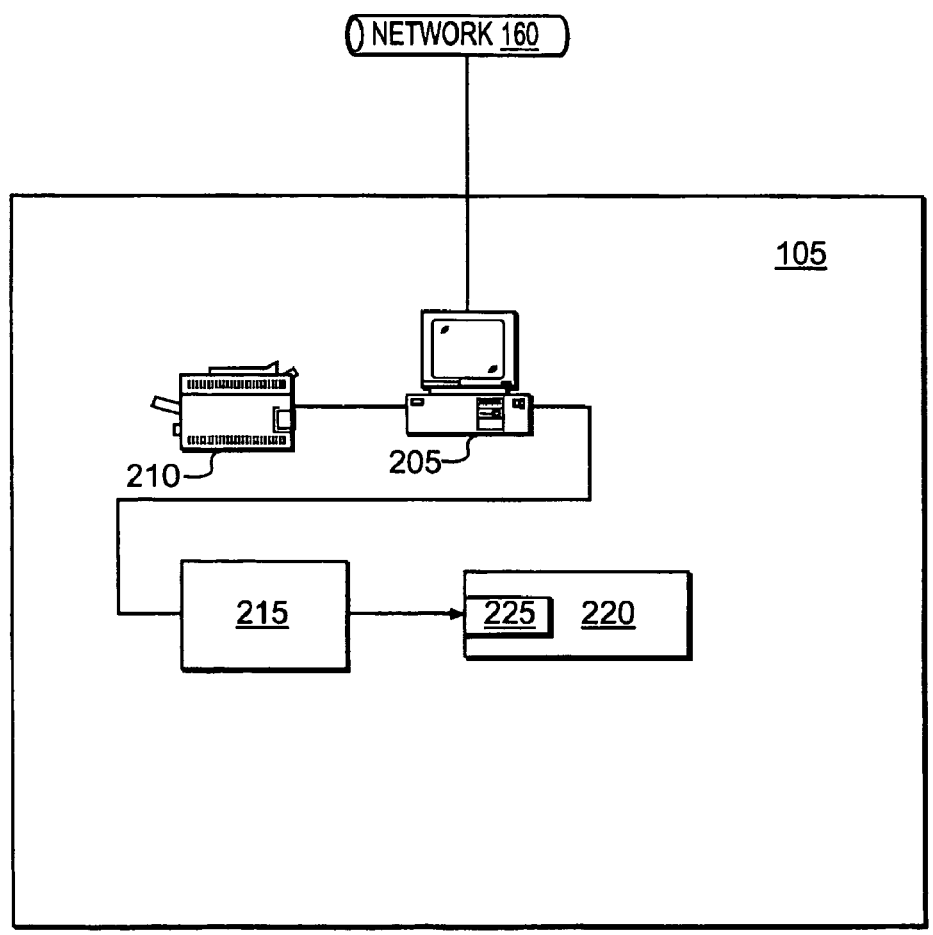
FIG. 2 is a functional block diagram of an exemplary production component consistent with an embodiment of the present invention.

Referring now to FIG. 2, production component 105 may comprise a production facility that creates and tenders items to the item delivery system operator. The production facility may comprise a production server 205, a printer 210, and an item production device 215. Under the control of production server 205, item production device 215 may produce an item or a plurality of items placed in a container, for example, a container 220. Prior to tendering container 220 to the delivery system operator, production server 205 may communicate with business interface system 130 over network 160 to enable production server to create a tracking indicia 225 for container 220. This communications, for example, may be conducted using internet web pages. Once enabled, production server 205 may cause printer 210 to produce tracking indicia 225.

Tracking indicia 225 may comprise a bar code or a PLANET code (described below). A bar code is a printed code used for recognition by a bar code scanner (reader). Traditional one-dimensional bar codes use the bar's width to encode a product or account number. Two-dimensional bar codes, such as PDF417, MAXICODE and DATAMATRIX, are scanned horizontally and vertically and hold considerably more data. Generally, PDF417 is widely used for general purposes, MAXICODE is used for high-speed sorting, and DATAMATRIX is used for marking small parts.

Historically, system operators sorted flat mail using POSTNET, a 12-digit barcode consisting of alternating long and short bars indicating the destination of, for example, a mailpiece. Responding to the expanding needs of users, particularly heavy volume users, PLANET code was developed on the foundation of the existing technical infrastructure. The PLANET Code is the opposite of the current POSTNET codes, reversing long bars for short and short bars for long. This innovation offers the convenience of a bar code that is easily applied using current bar-coding methods, and is readily scanned by the high-speed automation equipment already located in the plurality of plants within item delivery system 100.

In addition, related PCT patent application Serial No. PCT/US2002/003396, entitled "IMPROVED TRACKING LABEL" which has previously been incorporated by reference, describes an exemplary improved tracking label that may be used in conjunction with the present embodiment as tracking indicia 225. Those of ordinary skill in the art, however, will appreciate that other types of tracking indicia may be used.

Generally, at the production facility, there may be an application process running on, for example, production server 205, that will enable several types of electronic business strategies and that will facilitate the data marking, data marketing, or exchange of data between production server 205 and the delivery system operator. This application process, for example, may facilitate the production server's 205 creation of aforementioned tracking indicia 225 and may provide a gateway for communicating and exchanging information with customers or other senders on, for example, item volume or item traffic.

Server 205 may make data from tracking indicia 225 and data indicating that container 220 has been tendered available to management system 165, and specifically to business interface system 130 within management system 165. Business interface system 130 may provide a gateway for communicating and exchanging information with senders on, for example, item volume and item traffic. Data regarding tracking indicia 215 and data indicating that container 220 has been tendered, may be made available to users of management system 165, such as senders, recipients, the item delivery system operator, other systems of management system 165, or other as they are known by those of ordinary skill in the art.

Figure 3:
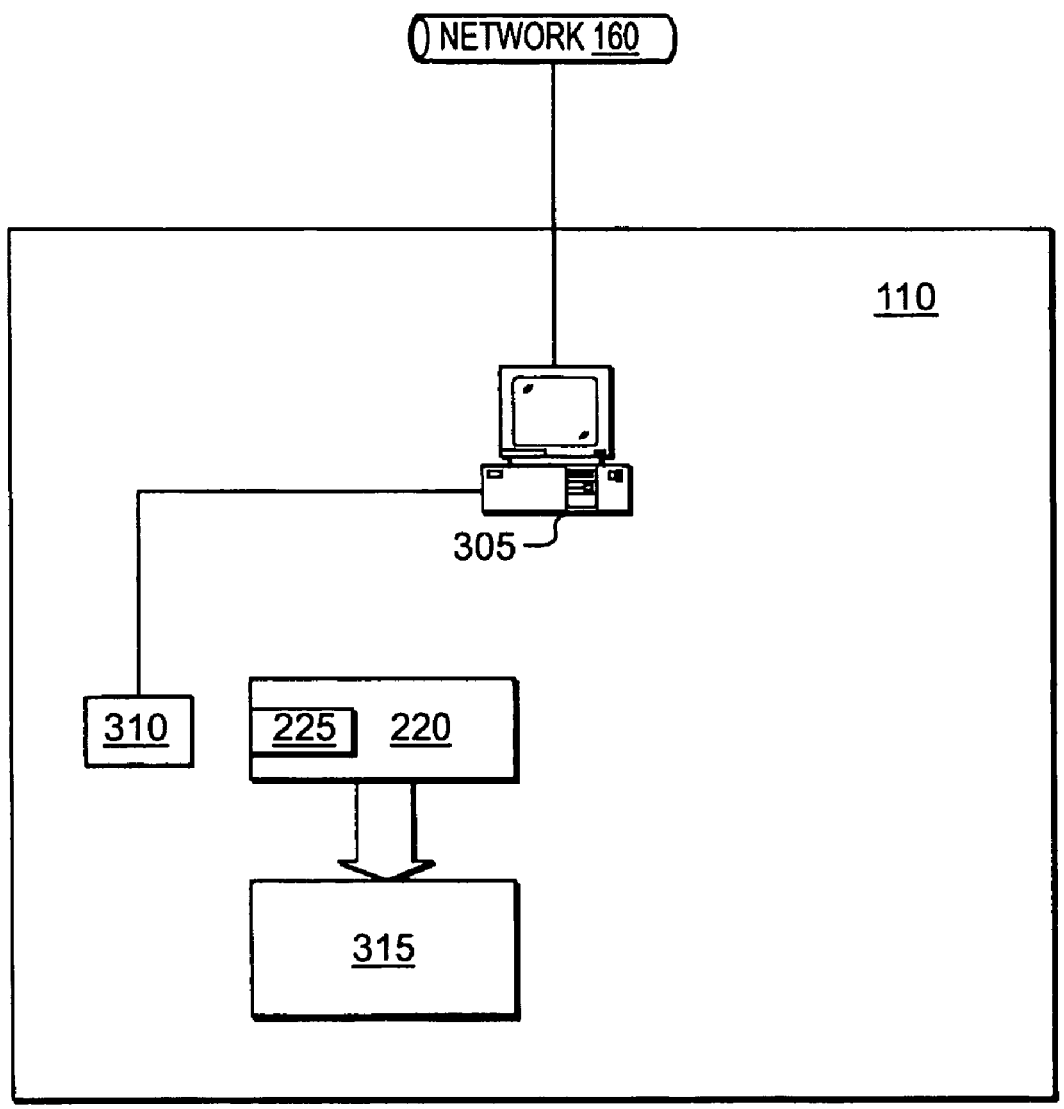
FIG. 3 is a functional block diagram of an exemplary transportation component consistent with an embodiment of the present invention.

Referring now to FIG. 3, transportation component 110 may comprise a transportation server 305, a scanner 310, and A transportation system 315. Transportation component 110 may assign items, such as container 220, to transportation system 315. Transportation system 315 may comprise rail, air, or trucking systems, however, those of ordinary skill in the art will appreciate that other transportation systems may be used. Prior to placing container 220 in transportation system 315 and sending it to induction and acceptance component 115, tracking indicia 225 is scanned by scanner 310. Scanner 310 may comprise any device capable of reading tracking indicia 225, placing the scanned data in digital form, and sending the data to transportation server 305. Transportation system 315, for example, takes items that have been tended by the sender and transports them to the primary induction points or the primary induction facilities in different cities or in the same city.

Server 305 may make data from tracking indicia 215 and data related to transportation system 315 available to management system 165, and specifically to surface/air management system 140 within management system 165. Surface/air management system 140 may track and monitor the movement of container 220 through system 100 between production component 105 and induction and acceptance component 115. Data regarding the transportation of container 220 may be made available to users of management system 165 such as senders, recipients, the item delivery system operator, other systems of management system 165, or other as they are known by those of ordinary skill in the art.

In tracking a monitoring transportation system 315, surface/air management system 140 may utilize the global positioning system (GPS). GPS is a system of 24 satellites, launched by the U.S. Department of Defense for identifying earth locations. By triangulation of signals from three of the satellites, a receiving unit can pinpoint its current location anywhere on earth to within a margin of error.

Figure 4:
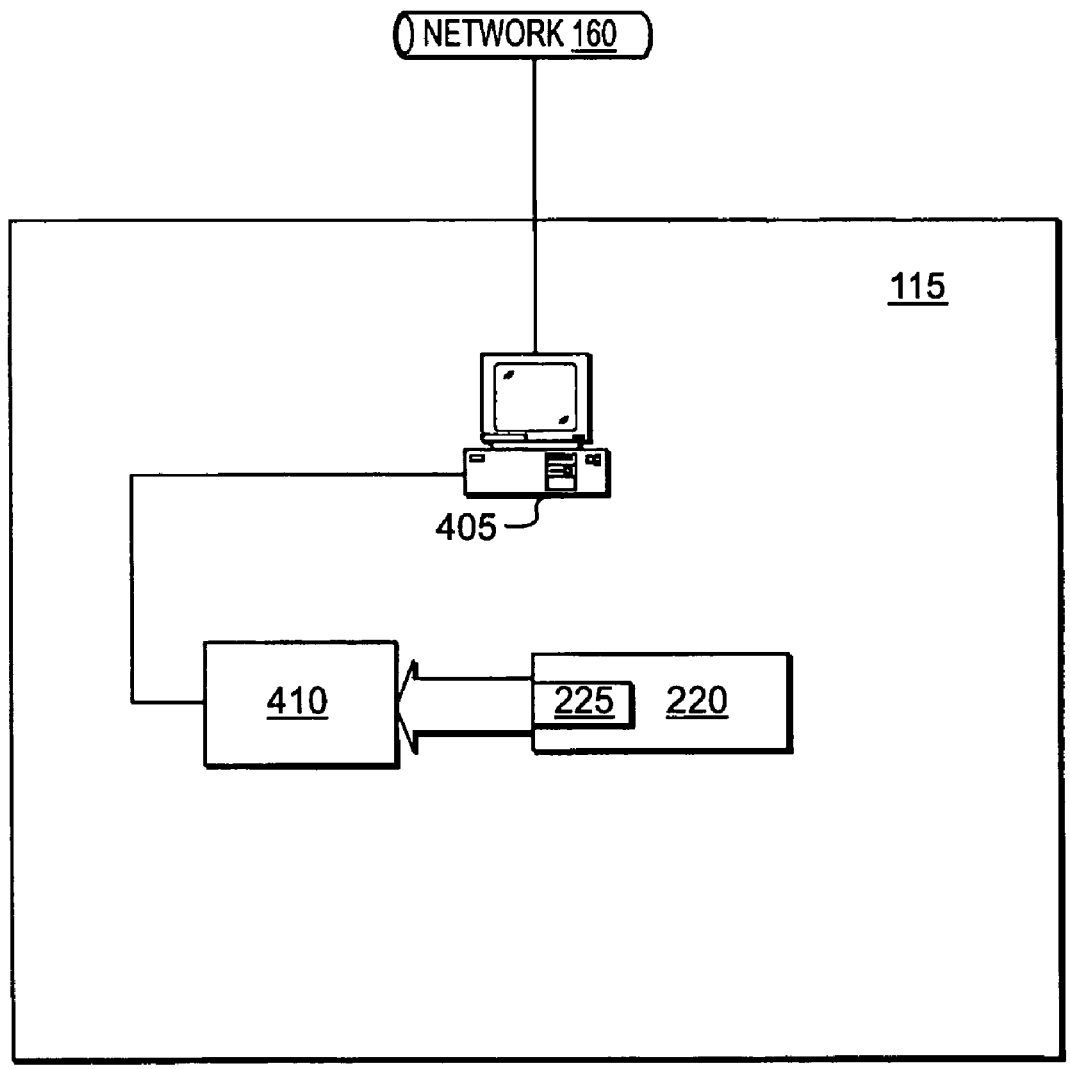
FIG. 4 is a functional block diagram of an exemplary induction and acceptance component consistent with an embodiment of the present invention.

Referring now to FIG. 4, induction and acceptance component 115 may comprise an induction and acceptance server 405 and data collection device 410. Generally, acceptance component 115 may initiate a process on induction and acceptance server 405 that is associated with resolving the accounts payable from the sender to the delivery system operator, and also may initiate a process associated with the physical acceptance and induction of items at a particular plant. At induction and acceptance component 115, a plurality of different types of processes used for monitoring the acceptance and induction of mail may be employed. These process may include quality assurance, item design quality analysts, and analysis of the preparation of the items to determine whether or not the items were properly prepared and that the proper discounts are being applied at this point and the processing environments. Those of ordinary skill in the art will appreciate that other types of analysis and processes may be used.

Server 405 makes data related to the induction and acceptance of items available to management system 165, and specifically to any of the systems comprising management system 165. Data regarding the induction and acceptance of items may be made available to users of management system 165 such as senders, the item delivery system operator, other systems of management system 165, or other as they are known by those of ordinary skill in the art.

Figure 5:
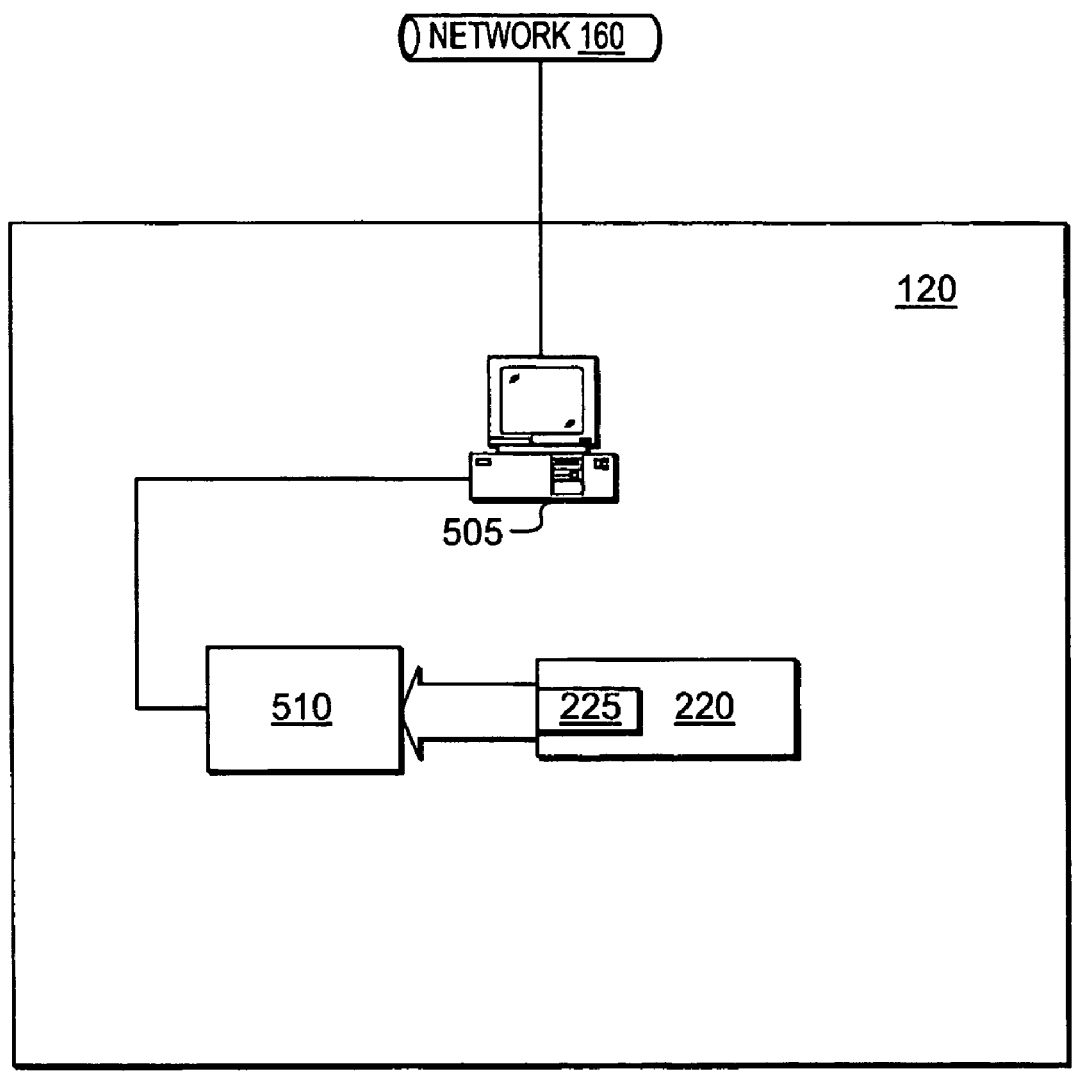
FIG. 5 is a functional block diagram of an exemplary processing component consistent with an embodiment of the present invention.

As shown in FIG. 5, processing component 120 may comprise a processing server 505 and at least one automated sorting device 510. Related PCT Patent Applications Ser. Nos. PCT/US2002/003393, and PCT/US2002/003395, entitled "SYSTEMS AND METHODS FOR PRODUCING AND MANAGING A TRACKING LABEL IN A AN ITEM DELIVERY SYSTEM", and "SYSTEMS AND METHODS FOR UTILIZING A TRACKING LABEL IN AN ITEM DELIVERY SYSTEM" respectively, which have previously been incorporated by reference, describe exemplary processes, servers, systems, devices, and equipment that may be used in conjunction with processing server 505 and sorting device 510 of the present embodiment. Those of ordinary skill in the art will appreciate, however, that other types of processes, servers, systems, devices, and equipment may be used in conjunction with processing server 505 and sorting device 510 of the present embodiment.

Generally, in delivering an item to a recipient, the item is sent through a delivery path comprises a plurality of plants. The plants within the delivery path contain, among other things, servers, automated systems, and sorting equipment that are designed to receive and process a plurality of items. The automated servers, systems, and sorting equipment comprising the delivery path may be configured to sense tracking indicia placed on items or containers of items as they passes through the elements of the delivery path directing the movement of the items or the containers of items. The movement of the items or the containers of items are directed through the delivery path until they efficiently converge on the location most favorable for the delivery of the items to the recipient of the item. Specifically, items may go through a series of handling operations that will allow the item to be sorted to a level where it can be delivered to the next processing plant, or facility, that would allow the item to be delivered to the recipient.

Processing server 505 may make data related to the processing of container 220 available to management system 165, and specifically to processing operations information system 145 within management system 165. Therefore, processing operations information system 145 may provide data on the movement of items, how much item volume is coming to a particular plant or facility, how much volume is leaving a plant or facility, and the types of traffic problems that may be determined from using the tracking indicia. Processing operations information system 145 may allow the item delivery system operator to isolate bottle necks and potentially resolve problems with items that are being either potentially misrouted or mismanaged. Furthermore, data regarding the processing of container 220 may be made available to users of management system 165 such as senders, recipients, the item delivery system operator, other systems of management system 165, or other as they are known by those of ordinary skill in the art.

Figure 6:
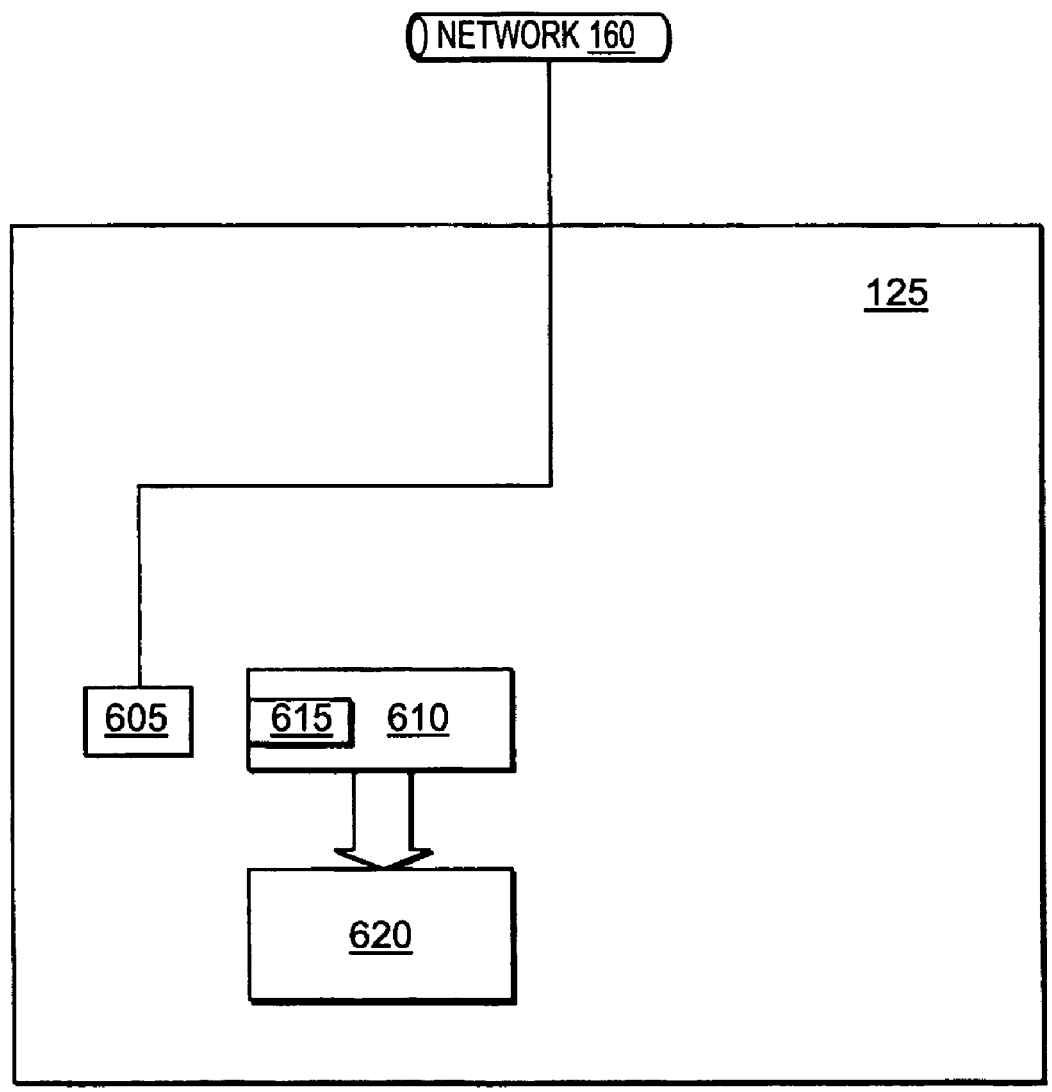
FIG. 6 is a functional block diagram of an exemplary delivery component consistent with an embodiment of the present invention.

Referring now to FIG. 6, delivery component 125 may comprise a delivery device 605, an item 610, a tracking indicia 615, and a recipient 620. Generally, delivery component 125 relates to the handling of an item that will allow it to be delivered a recipient. Specially, before item 610 is delivered to recipient 620, delivery device 605 may scan a tracking indicia 615 to obtain data with respect to item 610.

Delivery device 605 may make data, related to the delivery of item 610 to recipient 620, available to management system 165, and specifically to delivery operations information system 155 within management system 165. Therefore, delivery operations information system 155 may allow for the monitoring and management of the movement of items to recipients as opposed to monitoring the movement and processing ability to the processing component 120, which may be monitored by processing operations information system 145. Furthermore, data regarding the delivery of item 220 may be made available to users of management system 165 such as senders, recipients, the item delivery system operator, or other as they are known by those of ordinary skill in the art.

Referring now to FIG. 1, automatic base costing system 150 is connected to network 160 and included in management system 165. Automatic base costing system 150 is a fiscal and finance control system that may allow for monitoring of information associated with the cost for doing business and the cost for handling items. In performing its function, automatic base costing system 150 may monitor the amount of labor associated with any particular activity. Data from other systems in management system 165 associated with monitoring traffic and item volume traffic is fed into the automatic base costing system 150 system so the costs of actually managing and processing items may be calculated.

Data regarding the costs of actually managing and processing items may be made available to users of management system 165 such as senders, the item delivery system operator, other systems of management system 165, or other as they are known by those of ordinary skill in the art.

Referring now to FIG. 1, coding strategy system 135 is connected to network 160 and included in management system 165. System 135, for example, may enable senders of items to track items as they pass through system 100. This may be accomplished by various servers, systems, devices, and components of system 100 tracking an item by a tracking indicia, such as a planet code, and reporting this tracking to the management system 165. A user, for example, may access universal coding system 135 as well as other systems of management system 165 via the Internet.

Servers, systems, and devices utilized in system 100 may comprise mobile phones, personal computers, hand-held computing devices, multiprocessor systems, microprocessor-based or programmable consumer electronic devices, mini-computers, mainframe computers, personal digital assistants (PDA), facsimile machines, telephones, pagers, portable computers, or any other devices for, analyzing, receiving, and/or transmitting information. Servers, systems, and devices utilized in system 100 may utilize cellular telephone protocols such as wireless application protocol (WAP), or blue-tooth protocol. The invention, as disclosed in this embodiment, in its broadest sense is not limited to a particular form of system or communications protocol. And those of ordinary skill in the art will recognize that other systems and components may be utilized within the scope and spirit of the invention.

Figure 7:
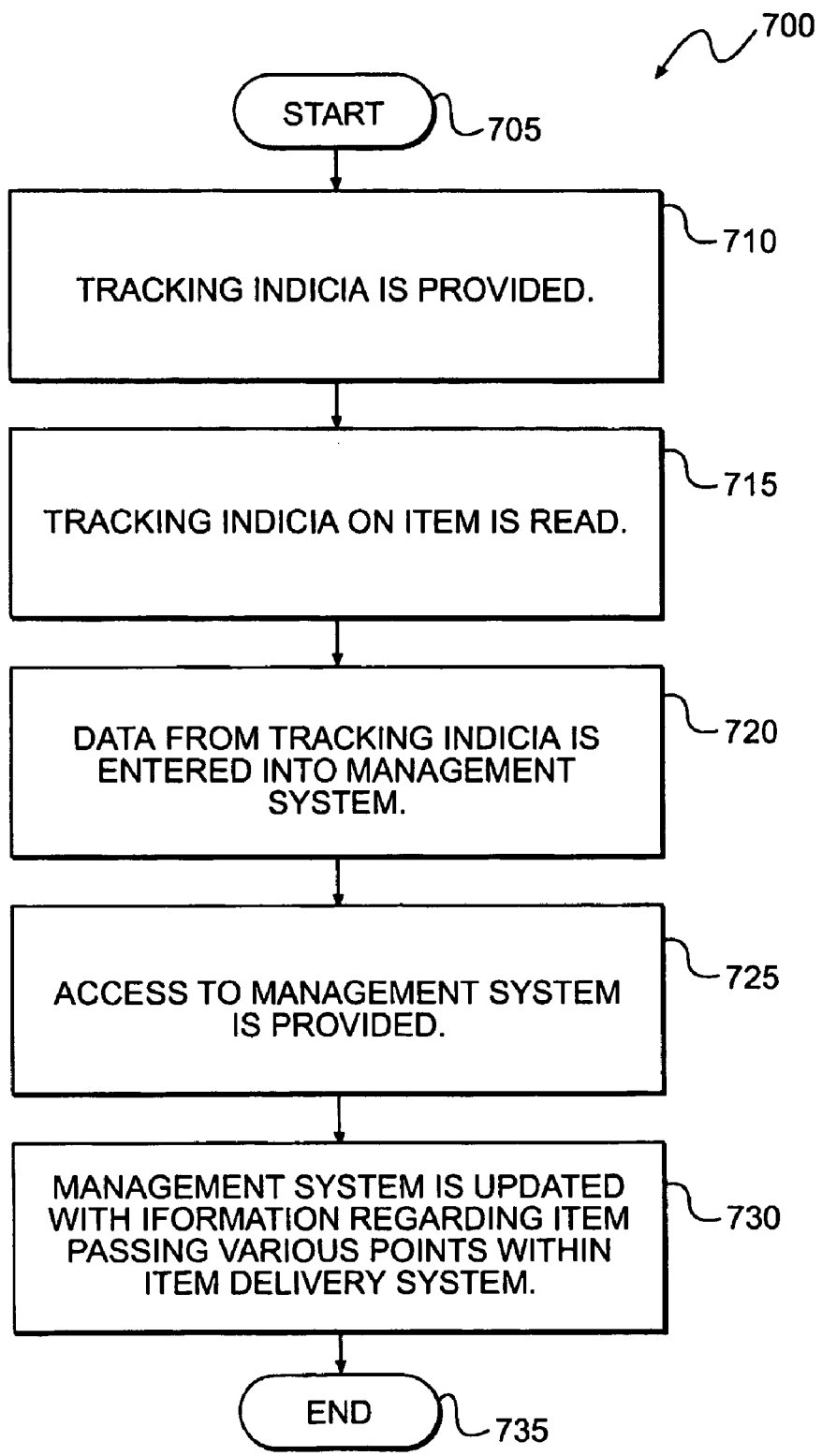
FIG. 7 is a flow chart of an exemplary method for tracking an item through an item delivery system consistent with an embodiment of the present invention.

FIG. 7 is a flow chart setting forth the general stages involved in exemplary method 700 for tracking an item through an item delivery system consistent with an embodiment of the present invention. Exemplary method 700 begins at starting block 705 and proceeds to stage 710 where tracking indicia 225 is provided. For example, under the control of production server 205, item production device 215 may produce an item or a plurality of items placed in a container, for example, a container 220. Prior to tendering the container to the delivery system operator, production server 205 may communicate with business interface system 130 over network 160 to enable production server to create a tracking indicia 225 for container 220. This communications, for example, may be conducted using internet web pages. Once enabled, production server 205 may cause printer 210 to produce tracking indicia 225.

From stage 710 where tracking indicia 225 is provided, exemplary method 700 continues to stage 715 where tracking indicia 225 on container 220 is read. For example, prior to placing container 220 in transportation system 315 and sending it to induction and acceptance component 115, tracking indicia 225 is scanned by scanner 310. Scanner 310 may comprise any device capable of reading tracking indicia 225, placing the data in digital form, and sending the data to transportation server 305.

After tracking indicia 225 on the container 220 is read in stage 715, exemplary method 700 advances to stage 720 where data from tracking indicia 225 is entered into management system 165. For example, server 305 may make data from tracking indicia 215, and data related to transportation system 315, available to management system 165, and specifically to surface/air management system 140 within management system 165. Surface/air management system 140 may track and monitor the movement of container 220 through system 100 between production component 105 and induction and acceptance component 115. Data regarding the transportation of container 220 may be made available to users of management system 165 such as senders, recipients, the item delivery system operator, other systems of management system 165, or other as they are known by those of ordinary skill in the art.

Once tracking indicia 225 is entered into management system 165 in stage 720, exemplary method 700 advances to stage 725 where access to management system 165 is provided. For example, data available on any of the systems comprising management system 165 may be made available to users of management system 165 such as senders, the item delivery system operator, other systems of management system 165, or other as they are known by those of ordinary skill in the art. For example, access to network 160 may be made available through the Internet in a conventional manner as is know by those of ordinary skill in the art.

From stage 725 where access to management system 165 is provided, exemplary method 700 continues to stage 730 where management system 165 is updated with information regarding container 220 passing various points within item delivery system 100. For example, in delivering an item to a recipient, the item is sent through a delivery path comprises a plurality of plants. The plants within the delivery path contain, among other things, servers, automated systems, and sorting equipment that are designed to receive and process a plurality of items. The automated servers, systems, and sorting equipment comprising the delivery path may be configured to sense tracking indicia placed on items or containers of items as they passes through the elements of the delivery path directing the movement of the items or the containers of items. The items or the containers of items are directed through the delivery path until they efficiently converge on the location most favorable for the delivery of the items to the recipient of the item. Specifically, items may go through a series of handling operations that will allow the item to be sorted to a level where it can be delivered to the next processing plant, or facility, that would allow the item to be delivered to the recipient.

Processing server 505 may make data related to the processing of container 220 available to management system 165, and specifically to processing operations information system 145 within management system 165. Therefore, processing operations information system 145 may provide data on the movement of items, how much item volume is coming to a particular plant or facility, how much volume is leaving a plant or facility, and the types of traffic problems that may be determined from using the tracking indicia. Processing operations information system 145 may allow the item delivery system operator to isolate bottle necks and potentially resolve problems with items that are being either potentially misrouted or mismanaged.

Embodiments of the present invention may provide accountability in the tracking of an item, not only to a facility, but also to the machine and time of day that the item was produced. Therefore, not only may problems be tracked to a specific facility and machine, but also to a specific operator or operators on the machine at the specific time the problem occurred. In conventional systems, this error correcting capability and tracking diagnostics are not provided.

Once management system 165 is updated with information regarding item 220 passing various points within item delivery system 100 in stage 730, exemplary method 700 ends at stage 735.

It will be appreciated that a system in accordance with an embodiment of the invention can be constructed in whole or in part from special purpose hardware or a general purpose computer system, or any combination thereof. Any portion of such a system may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for tracking an item through an item delivery system, the item delivery system comprising a plurality of plants adapted to process the item and perform item handling functions, the method comprising:

placing a first tracking indicia on the item at a first plant, the first tracking indicia containing information related to the first plant;

reading the first tracking indicia on the item at the first plant;

entering information obtained from reading the first tracking indicia into a management system, the management system having a plurality of management sub-systems separate from the plants, the management sub-systems performing management functions different from the item handling functions;

sending information obtained from reading the first tracking indicia at the first plant to at least a first management sub-system;

transporting the item to a second plant;

removing the first tracking indicia from the item at the second plant;

inserting the first tracking indicia removed from the item into an indicia reading device at the second plant;

reading the first tracking indicia inserted into the indicia reading device;

sending information read from the first tracking indicia by the indicia reading device at the second plant to at least a second management sub-system;

analyzing the information obtained from reading the first tracking indicia at at least one of the first plant and the second plant;

verifying routing information of the item while the item is being processed at the second plant, based on the analyzing;

placing a second tracking indicia on the item at the second plant, the second tracking indicia containing updated routing information, at least a portion of the updated routing information being related to the second plant and being different from the information contained in the first tracking indicia; and routing the item having the second tracking indicia within the item delivery system according to the updated routing information.

2. The method of claim 1, wherein the item comprises at least one of a mail tray, a mail sack, mail tub, a mailpiece, a United States Postal Service Priority Mail package, or a United States Postal Service Express Mail package.

3. The method of claim 1, wherein the first tracking indicia and the second tracking indicia each comprise at least one of a bar code, a PLANET code, or a tracking label.

4. The method of claim 1, wherein the management system comprises at least one of a business interface system, a coding strategy system, a surface/air management system, a processing operations information system, an activity-based costing system, or a delivery operations information system.

5. The method of claim 4, wherein the business interface system comprises a system for providing a gateway for communicating and exchanging information with senders.

6. The method of claim 4, wherein the coding strategy system comprises a system for enabling at least one of a sender of the item or a recipient of the item to track the item as the item passes through the item delivery system.

7. The method of claim 4, wherein the surface/air management system comprises a system for monitoring the movement of the item through the item delivery system between a production component and an induction and acceptance component.

8. The method of claim 7, wherein the system for monitoring the movement of the item employs the global positioning system (GPS).

9. The method of claim 4, wherein the processing operations information system comprises a system for providing at least one of data on the movement of the item, item volume entering a plant, item volume leaving a plant, or types of traffic problems determined as a result of tracking the item.

10. The method of claim 4, wherein the activity-based costing system comprises a system for monitoring information associated with the cost of doing business and for handling items.

11. The method of claim 4, wherein the delivery operations information system comprises a system for monitoring and managing the movement of the item to a recipient.

12. The method of claim 1, further comprising providing at least one of a sender, recipient, or an item delivery system operator access to the management system.

13. The method of claim 1, wherein the information contained in the first tracking indicia and the second tracking indicia comprises at least one of an identification of a point passed in the item delivery system or a time a point was passed in the item delivery system.

14. The method of claim 1, further comprising:
holding the first tracking indicia inserted into the indicia reading device within the indicia reading device, after determining that the item having the first tracking indicia has been properly routed to the second plant.

15. A system for tracking an item, the system comprising:
an item delivery system comprising a plurality of plants adapted to process the item and perform item handling functions, the item delivery system further comprising a management system having a plurality of management sub-systems separate from the plants, the management sub-systems performing management functions different from the item handling functions;
a component disposed at a first plant, the component configured for providing a first tracking indicia on the item, the first tracking indicia containing information related to the first plant;
a first indicia reading device disposed at the first plant and configured for reading the first tracking indicia;
at least one component for sending information obtained from reading the first tracking indicia at the first plant to at least a first management sub-system;
a second indicia reading device disposed at a second plant and configured for receiving the first tracking indicia after the first tracking indicia has been removed from the item and reading the received first tracking indicia;
at least one component disposed at the second plant and configured for sending information read from the first tracking indicia at the second plant to at least a second management sub-system;
a component for analyzing the information obtained from reading the first tracking indicia at at least one of the first plant and the second plant;
a component for verifying routing information of the item based on a result of the analyzing while the item is being processed at the second plant; and a component for generating a second tracking indicia that is placed on the item at the second plant, the second tracking indicia containing updated routing information, at least a portion of the updated routing information being related to the second plant and being different from the information contained in the first tracking indicia.

16. The system of claim 15, wherein the item comprises at least one of a mail tray, a mail sack, mail tub, a mailpiece, a United States Postal Service Priority Mail package, or a United States Postal Service Express Mail package.

17. The system of claim 15, wherein at least one of the first tracking indicia and the second tracking indicia comprises at least one of a bar code, a PLANET code, or a tracking label.

18. The system of claim 15, wherein the management system comprises at least one of a business interface system, a coding strategy system, a surface/air management system, a processing operations information system, an activity-based costing system, or a delivery operations information system.

19. The system of claim 18, wherein the business interface system comprises a system for providing a gateway for communicating and exchanging information with senders.

20. The system of claim 18, wherein the coding strategy system comprises a system for enabling at least one of a sender of the item or a recipient of the item to track the item as the item passes through the item delivery system.

21. The system of claim 18, wherein the surface/air management system comprises a system for monitoring the movement of the item through the item delivery system between a production component and an induction and acceptance component.

22. The system of claim 21, wherein the system for monitoring the movement of the item employs the global positioning system (GPS).

23. The system of claim 18, wherein the processing operations information system comprises a system for providing at least one of data on the movement of the item, item volume entering a plant, item volume leaving a plant, or types of traffic problems determined as a result of tracking the item.

24. The system of claim 18, wherein the activity-based costing system comprises a system for monitoring information associated with the cost of doing business and for handling items.

25. The system of claim 18, wherein the delivery operations information system comprises a system for monitoring and managing the movement of the item to a recipient.

26. The system of claim 15, further comprising a component for providing at least one of a sender, recipient, or an item delivery system operator access to the management system.

27. The system of claim 15, wherein the information comprises at least one of an identification of a point passed in the item delivery system or a time a point was passed in the item delivery system.

28. The system of claim 15, wherein the second indicia reading device is further configured for:
holding the first tracking indicia removed from the item within the second indicia reading device, after the component for verifying routing information determines that the item having the first tracking indicia has been properly routed to the second plant.

29. A system for tracking an item, the system comprising:
an item delivery system comprising a plurality of plants adapted to process the item and perform item handling functions, the item delivery system further comprising a management system having a plurality of management sub-systems separate from the plants, the management sub-systems performing management functions different from the item handling functions;

means for providing a first tracking indicia on the item at a first plant, the first tracking indicia containing information related to the first plant;

means for reading the first tracking indicia on the item at the first plant;

means for sending information obtained from reading the first tracking indicia at the first plant to at least a first management sub-system;

means for receiving the first tracking indicia after the first tracking indicia has been removed from the item and reading the received first tracking indicia, while the item is being processed at a second plant;

means for sending information obtained from reading the first tracking indicia at the second plant to at least a second management sub-system;

means for analyzing the information obtained from reading the first tracking indicia at at least one of the first plant and the second plant;

means for verifying routing information of the item based on a result of the analyzing while the item is being processed at the second plant; and means for generating a second tracking indicia that is placed on the item at the second plant, the second tracking indicia containing updated information, at least a portion of the updated routing information being related to the second plant and being different from the information contained in the first tracking indicia.

30. A method for tracking an item through an item delivery system, the item delivery system comprising a plurality of components defining an item delivery path, the plurality of components adapted to process the item and perform item handling functions, the method comprising:

receiving the item at a first component in the item delivery path;

reading, in response to receiving the item at the first component, a first tracking indicia on the item;

forwarding tracking information associated with the item from the first component to a first set of one or more management sub-systems in a management system, the management system including a plurality of management sub-systems separate from the components defining the item delivery path, the management sub-systems performing management functions different from the item handling functions, the tracking information containing information read from the first tracking indicia;

receiving the item at a second component in the item delivery path;

removing, at the second component, the first tracking indicia from the item;

reading the first tracking indicia from the item at the second component, after the first tracking indicia is removed from the item;

forwarding tracking information associated with the item from the second component to a second set of one or more management sub-systems, the second set of management sub-systems being different than the first set of management sub-systems;

analyzing information obtained from reading the first tracking indicia at at least one of the first component and the second component;

verifying routing information associated with the item based on a result of the analyzing;

attaching a second tracking indicia to the item, the second tracking indicia containing updated routing information, at least a portion of the updated routing information being related to the second component and being different from the information contained in the first tracking indicia; and transporting the item having the second tracking indicia within the item delivery system according to the updated routing information.

31. The method of claim 30, wherein at least one management sub-system is included in both the first and second sets of management sub-systems.

32. The method of claim 30, wherein the first and second components are located adjacent to each other in the item delivery path.

33. The method of claim 30, further comprising providing access to tracking information associated with the item through at least one management sub-system in the management system.

34. The method of claim 1, wherein the item comprises a plurality of items, each of the items comprising a tracking indicia, the method further comprising:

identifying delivery traffic associated with delivering the plurality of items based on analyzing the information obtained from reading the tracking indicia on the items.

35. The method of claim 1, wherein verifying the routing information comprises:

determining whether the item having the first tracking indicia has been misrouted to the second plant;

rejecting, from the indicia reading device, the first tracking indicia when it is determined that the item having the first tracking indicia has been misrouted to the second plant; and generating an alarm signal to alert an operator regarding the rejecting.

36. The method of claim 1, further comprising:

identifying, while the item is being processed at the second plant and from the information obtained from the first tracking indicia, a point within the first plant at which the item has been mishandled.

37. The system of claim 15, wherein the component for verifying the routing information of the item is further configured to identify a problem associated with delivery traffic within the item delivery system.

38. The system of claim 15, wherein the component for verifying the routing information is further configured for:

determining whether the item having the first tracking indicia has been misrouted to the second plant;

rejecting, from the second indicia reading device, the first tracking indicia when it is determined that the item having the first tracking indicia has been misrouted to the second plant; and generating an alarm signal to alert an operator regarding the rejecting.

39. The system of claim 15, further comprising a component for:

identifying, while the item is being processed at the second plant and from the information obtained from the first tracking indicia, a point within the first plant at which the item has been mishandled.

40. The method of claim 30, wherein the item comprises a plurality of items, each of the items comprising a tracking indicia, the method further comprising:

identifying delivery traffic associated with delivering the plurality of items based on analyzing the information obtained from reading the tracking indicia on the items.

41. The method of claim 30, wherein verifying the routing information comprises:

determining whether the item having the first tracking indicia has been misrouted to the second component; and generating an alarm signal to alert an operator when the item has been misrouted.

42. The method of claim 30, further comprising:

identifying, while the item is being processed at the second component and from the information obtained from the first tracking indicia, a point within the first component at which the item has been mishandled.

\* \* \* \* \*